US 10,919,478 B2

(12) United States Patent
O'Connor et al.

(10) Patent No.: US 10,919,478 B2
(45) Date of Patent: Feb. 16, 2021

(54) VEHICLE STOWAGE BIN

(71) Applicant: Ford Global Technologies, LLC, Dearborn, MI (US)

(72) Inventors: Chris O'Connor, Livonia, MI (US); Michael James Andrus, Northville, MI (US); Amanda Villerot, Beverly Hills, MI (US); Sue Muscat, South Lyon, MI (US); Jim Carene, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 16/385,185

(22) Filed: Apr. 16, 2019

(65) Prior Publication Data
US 2020/0331416 A1 Oct. 22, 2020

(51) Int. Cl.
*B60R 21/20* (2011.01)
*B60R 5/02* (2006.01)
*B60R 21/264* (2006.01)
*B60R 21/2338* (2011.01)

(52) U.S. Cl.
CPC .............. *B60R 21/20* (2013.01); *B60R 5/02* (2013.01); *B60R 21/2338* (2013.01); *B60R 21/264* (2013.01); *B60R 2021/23386* (2013.01)

(58) Field of Classification Search
CPC ......... B60R 21/20; B60R 21/206; B60R 5/00; B60R 5/04; B60R 5/045; B60R 7/00; B60R 7/043; B60R 7/06
See application file for complete search history.

(56) References Cited

U.S. PATENT DOCUMENTS

| | | | |
|---|---|---|---|
| 5,772,370 A | 6/1998 | Moore | |
| 6,004,084 A | 12/1999 | Moker | |
| 6,099,222 A | 8/2000 | Moore | |
| 6,390,526 B1 | 5/2002 | Ament et al. | |
| 7,309,011 B2 * | 12/2007 | He | G06K 7/10732 235/385 |
| 7,850,198 B2 * | 12/2010 | Hayakawa | B60R 21/231 280/730.1 |
| 8,308,189 B2 * | 11/2012 | Matsushima | B62D 25/145 280/732 |
| 9,637,078 B2 | 5/2017 | Bull | |
| 2002/0180188 A1 * | 12/2002 | Abe | B60R 21/205 280/730.1 |
| 2005/0116449 A1 * | 6/2005 | Enders | B60R 21/206 280/730.1 |
| 2010/0066064 A1 * | 3/2010 | Kotikovsky | B60R 7/06 280/728.3 |

(Continued)

FOREIGN PATENT DOCUMENTS

| | | |
|---|---|---|
| DE | 19722501 A1 | 12/1997 |
| DE | 102007017998 A1 | 10/2008 |

*Primary Examiner* — James A English
(74) *Attorney, Agent, or Firm* — Frank A. MacKenzie; Bejin Bieneman PLC

(57) ABSTRACT

An apparatus includes a stowage bin defining a compartment and an airbag mounted to the stowage bin. The airbag is deployable to an inflated position. When the airbag is in the inflated position, the airbag at least partially encloses the compartment. When in the inflated position, the airbag retains items, if any, that are stored in the compartment by an occupant of the vehicle.

20 Claims, 5 Drawing Sheets

(56) References Cited

U.S. PATENT DOCUMENTS

2011/0096439 A1* 4/2011 Soga ................. G11B 5/4826
  360/244.2
2011/0278826 A1* 11/2011 Fukawatase .......... B60R 21/231
  280/730.2

* cited by examiner

VEHICLE STOWAGE BIN

BACKGROUND

Vehicles include storage areas in the interior of the vehicle for storing luggage, bags, entertainment devices, vehicle-maintenance devices, etc. As one example, a vehicle may be a ride-share vehicle in which occupants enter and exit the vehicle routinely and have a need to securely store items during transit. There remains an opportunity to develop stowage bin that is in an easily accessible location and that securely retains the stored items during a sudden deceleration of a vehicle.

DETAILED DESCRIPTION

Figure 1:
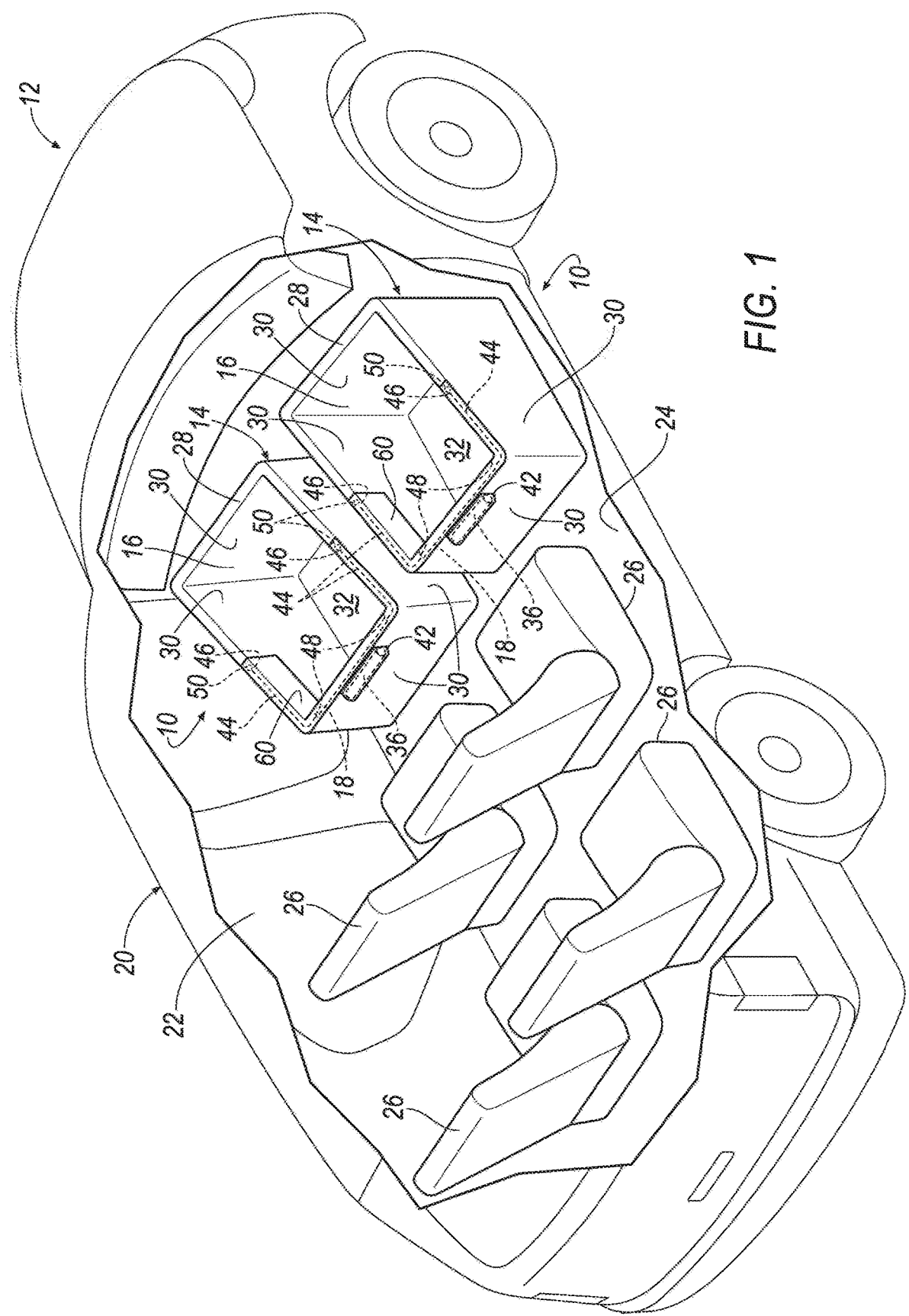
FIG. 1 is a perspective view of a vehicle including a pair of stowage bins having airbags that at least partially enclose the stowage bins.

An apparatus including a stowage bin defining a compartment. The apparatus includes an airbag mounted to the stowage bin and deployable to an inflated position, the airbag in the inflated position at least partially enclosing the compartment.

The apparatus may include an external tether extending from the airbag to the stowage bin.

The external tether may have an end fixed to the stowage bin.

The external tether may be slidably attached to the stowage bin.

The stowage bin may include a recessed track slideably engaged with the external tether.

The apparatus may include a vehicle seat, the airbag being between the vehicle seat and the compartment in an uninflated position.

The apparatus may include a pressure sensor fixed to the stowage bin below the compartment.

The apparatus may include a floor below the compartment and a pressure sensor supported by the floor.

The apparatus may include an inflator removably mounted to the stowage bin, the inflator in fluid communication with the airbag.

The airbag may include an inflation chamber and an uninflatable panel.

The airbag may be mounted to a wall of the stowage bin and the uninflatable panel is between the inflation chamber and the wall.

The inflator may be a pyrotechnic inflator.

The inflator may include a canister of pressurized fluid.

The apparatus may include a vehicle seat, the inflator mounted to the stowage bin between the vehicle seat and the compartment.

The stowage bin may include an upper lip around the compartment, the airbag being supported by the upper lip.

With reference to the Figures, wherein like numerals indicate like parts throughout the several views, an apparatus 10 for a vehicle 12 includes a stowage bin 14 defining a compartment 16 and an airbag 18 mounted to the stowage bin 14. The airbag 18 is deployable to an inflated position. When the airbag 18 is in the inflated position, the airbag 18 at least partially encloses the compartment 16.

The compartment 16 is easily accessible by occupants of the vehicle 12 to place and retrieve items, such as luggage, bags, entertainment devices, vehicle-maintenance devices, etc. In the event of a sudden deceleration of a vehicle, e.g. a vehicle impact, roll over, hard braking, pre-collision activation, etc., the airbag 18 is inflatable to at least partially enclose the compartment 16 of the stowage bin 14 to retain any items, such as luggage, baggage, travel items, vehicle maintenance items, etc., in the compartment 16.

With reference to FIG. 1, the vehicle 12 may be any type of vehicle 12 such as a car, a truck, a sport utility vehicle, a crossover vehicle, a van, a minivan, a taxi, a bus, airplane, boat, rail car, subway, etc. The vehicle 12 may include a computer to operate the vehicle 12 in an autonomous mode; a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering. The vehicle 12 may be, for example, a ride-sharing vehicle.

The vehicle 12 includes a body 20. The body 20 defines a passenger compartment 22 to house occupants, if any, and other components of the apparatus 10. The body 20 includes a floor 24 disposed at the bottom of the passenger compartment 22.

The vehicle 12 may include one or more seats 26 in the passenger compartment 22. The vehicle 12 may include any suitable number of seats 26 in any suitable position, e.g., front seats, back seats, left side, right side, etc. The position and orientation of the seats 26 and components thereof may be adjustable.

With continued reference to FIG. 1, the stowage bin 14 may be disposed at a front portion of the passenger compartment 22. In such an example, the seats 26 are disposed vehicle-rearward of the stowage bin 14. As shown in FIG. 1, the vehicle 12 may include any suitable number of stowage bins 14, i.e., one or more. The stowage bins 14 may be at any suitable location in the vehicle 12. In the example shown in the Figures, two stowage bins 14 are in the front portion of the passenger compartment 22. In addition, or in the alternative, other stowage bins 14 may be at other suitable locations, e.g., behind the seats 26, between seats 26, etc. The stowage bin 14 may be supported on the floor 24 and/or fixed to the floor 24.

As shown in FIGS. 1-5, the compartment 16 may be open upwardly. The stowage bin 14 may include an upper lip 28 around the compartment 16. The stowage bin 14 may include a plurality of walls 30 defining the upper lip 28. The walls 30 may be upright, i.e., have a vertical component. In one example, the walls 30 may be vertical. The compartment 16 may be any suitable shape and may have any suitable number of walls 30 defining the shape of the compartment 16. For example, the compartment 16 may be rectangular with four walls 30 defining the compartment 16. The stowage bin 14 may include a bottom 32 that supports the items. In such an example, the walls 30 extend upwardly from the bottom 32 to the upper lip 28. As another example, the walls 30 may extend upwardly from the floor 24 to the upper lip 28. In such an example, the floor 24 may define the lower boundary of the compartment 16 and the floor 24 may directly support the items.

The apparatus 10 may include a pressure sensor that detects the presence of items in the compartment 16 of the stowage bin 14. Specifically, the pressure sensor may be configured to be triggered by the weight of the items, in which case the pressure sensor generates a signal indicating items are present in the compartment 16. The pressure sensor may be below the compartment 16. The pressure sensor may be supported by the stowage bin 14 and/or the floor 24. For example, the pressure sensor may be fixed to the stowage bin 14, e.g., at the bottom 32. In another example, the pressure sensor may be fixed to the floor 24 with the compartment 16 of the stowage bin 14 above the pressure sensor, i.e., the pressure sensor is between the compartment 16 of the stowage bin 14 and the floor 24.

The apparatus 10 includes an airbag assembly 34 that includes the airbag 18 and an inflator 36. The airbag assembly 34 may be mounted to one of the walls 30 of the stowage bin 14. The airbag assembly 34 may be mounted to the upper lip 28 of the stowage bin 14. In such an example, the airbag 18 may inflate over the compartment 16, i.e., the entire compartment 16 may be below the airbag 18 when inflated. In another example, the airbag assembly 34 may be mounted to the wall 30 at a position spaced from the upper lip 28, i.e., below the upper lip 28.

The airbag assembly 34 may be mounted to the stowage bin 14 between the seats 26 and the compartment 16 of the stowage bin 14. For example, the airbag assembly 34 may be mounted to one of the walls 30 disposed between the compartment 16 and the seat 26. In the example where the stowage bin 14 is vehicle-forward of the seat 26 (e.g., a front seat), the airbag assembly 34 may be mounted to the wall 30 that is vehicle-rearward of the compartment 16.

Figure 4:
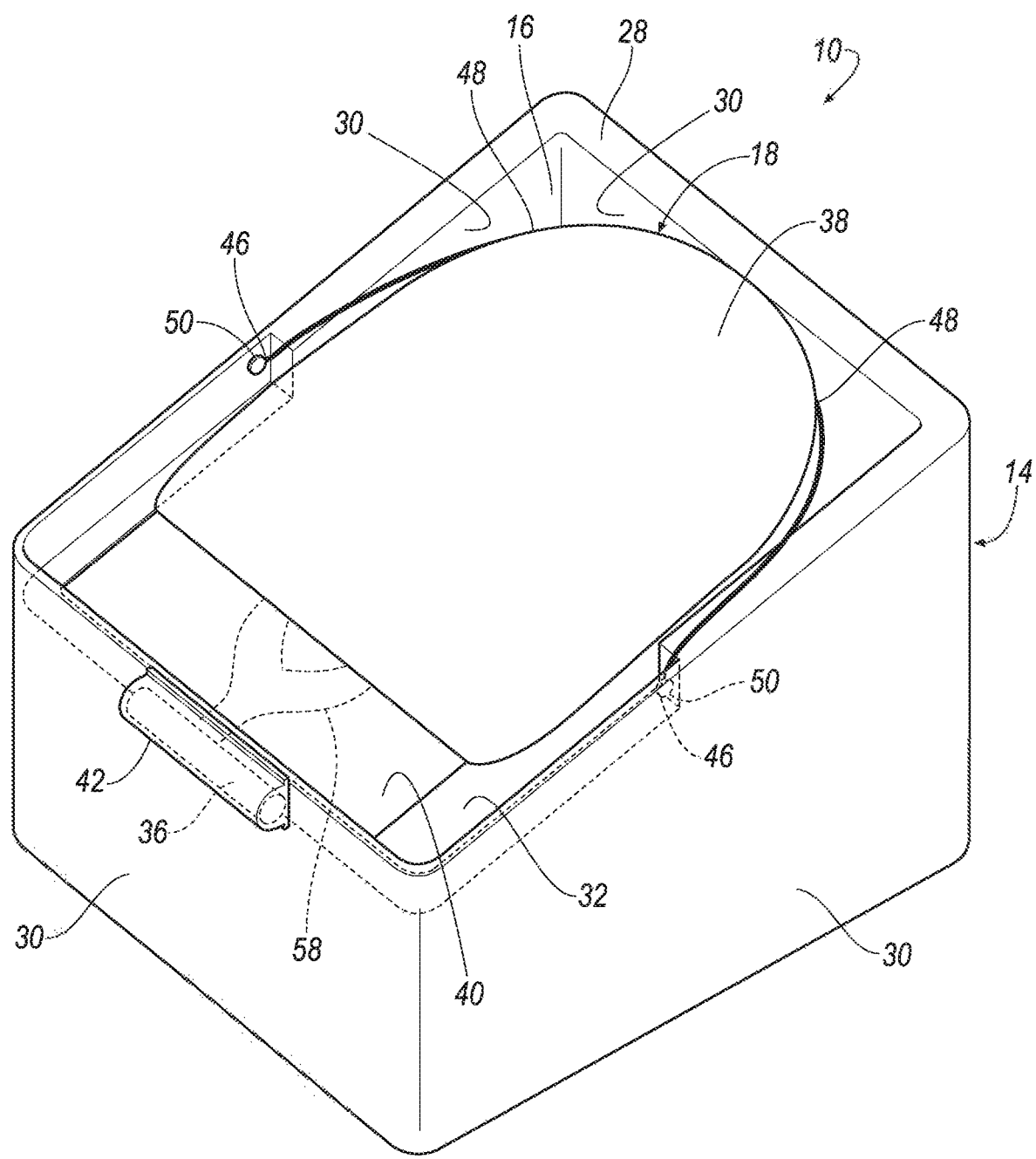
FIG. 4 is a perspective view of the stowage bin with the airbag deployed to an inflated position.
Figure 5:
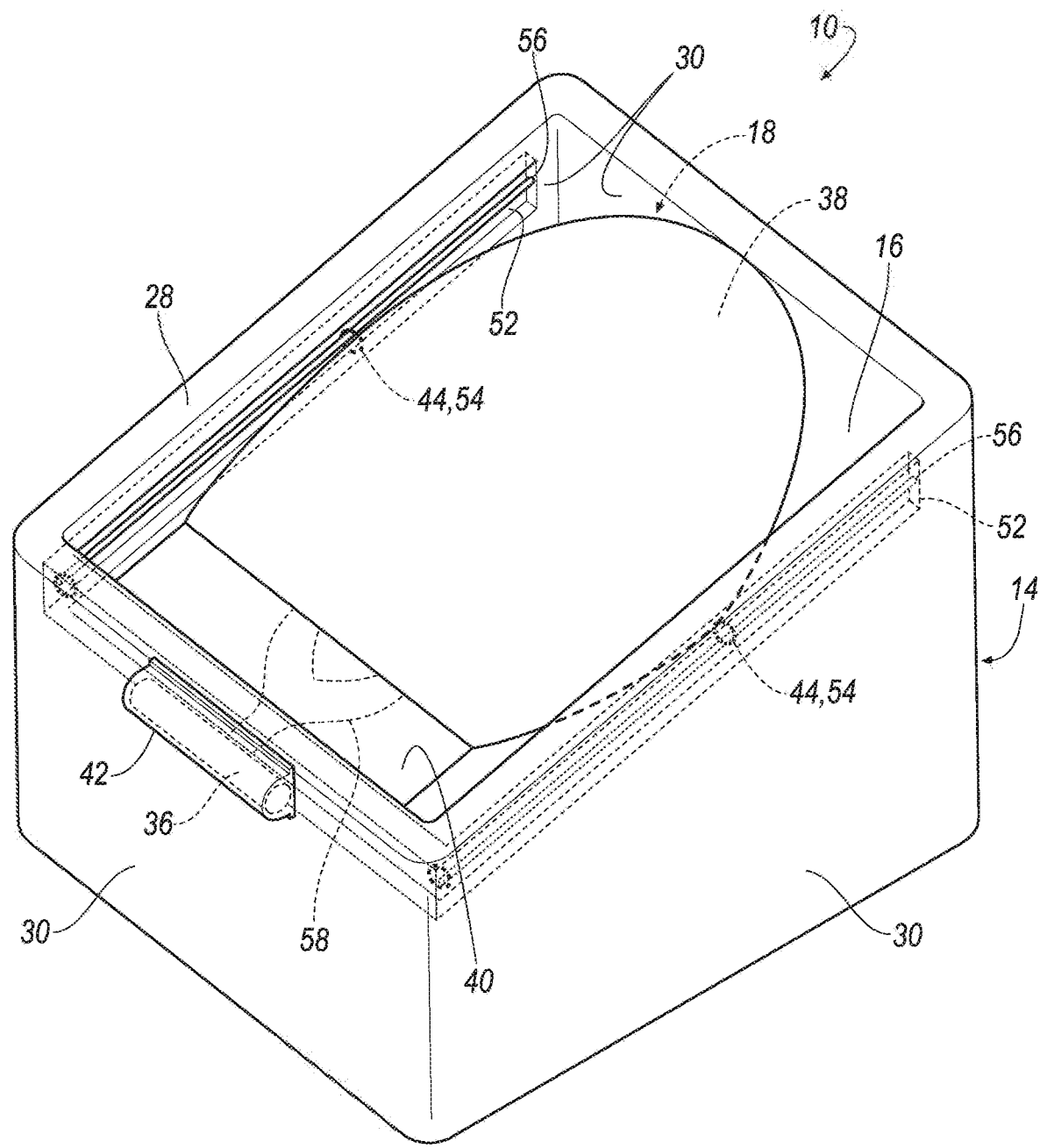
FIG. 5 is a perspective view of another embodiment of the stowage bin where the external tethers are slidably attached to the stowage bin.

As shown in FIGS. 4 and 5, the airbag 18 is deployable to the inflated position from an uninflated position to at least partially enclose the compartment 16 of the stowage bin 14. The airbag 18 in the inflated position encloses the compartment 16 sufficiently to retain items in the compartment 16, e.g., during a sudden deceleration. In the example shown in the Figures, the airbag 18 may only partially enclose the compartment 16, i.e., does not extend across the entire compartment 16. As another example, the airbag 18 may completely enclose the compartment 16, i.e., may extend across the complete upper boundary of the compartment 16. In such an example, the airbag 18 may abut the entire periphery of the upper lip 28.

The airbag 18 inflates away from the wall 30 of the stowage bin 14 to which the airbag 18 assembly is mounted. In the example shown in FIG. 1, the airbag 18 inflates in a vehicle-forward direction, i.e., the airbag 18 inflates in a direction away from the seat 26. Generally, the airbag 18 may deploy in a direction away from an occupant in a seat 26 in the vehicle 12. In such an example, the airbag 18 in the inflated position remains generally vertically stationary relative to the wall 30 from which the airbag 18 deploys. This assists in retention of the items in the compartment 16.

As shown in FIGS. 4 and 5, the airbag 18 includes an inflation chamber 38. The inflation chamber 38 is inflated with an inflation medium from the inflator 36, as described below. The airbag 18 may include an uninflatable panel 40. The uninflatable panel 40 is not in fluid communication with the inflation chamber 38 and is not inflated when the inflation chamber 38 is inflated. The uninflatable panel 40 may extend between the stowage bin 14 and the inflation chamber 38. For example, the uninflatable panel 40 may extend from the wall 30 of the stowage bin 14 to the inflation chamber 38. Inflation channels 58 may extend from the inflator 36 to the inflation chamber 38 to deliver the inflation medium to the inflation chamber 38. The uninflatable panel 40 may be isolated from the inflation chamber 38 in any suitable way, e.g., stitching, adhesive, etc.

The airbag 18 may be a woven polymer or any other material. As one example, the airbag 18 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 36 is in fluid communication with the airbag 18. Upon receiving a signal, the inflator 36 may inflate the airbag 18 with an inflatable medium. As one example, the inflator 36 may be a pyrotechnic inflator. Upon receiving a signal from, e.g., the vehicle computer, the inflator 36 may inflate the airbag 18 with an inflatable medium, such as a gas. In examples where the inflator 36 is a pyrotechnic inflator, the inflator 36 uses a chemical reaction to drive inflation medium to the airbag 18. The pyrotechnic inflator may be of any suitable type, for example, a cold-gas inflator. As another example, the inflator 36 may include, for example, a canister of pressurized fluid. In such an example, the inflator 36 may include a releasable valve for selectively releasing the pressurized fluid from the canister to the inflation chamber 38. The releasable valve may be electronically releasable, pyrotechnically releasable, etc. Upon receiving a signal from, e.g., the vehicle computer, the valve may open to inflate the inflation chamber 38 of the airbag 18. The pressurized fluid may be any suitable fluid and may be in a gaseous state when inflating the inflation chamber 38 of the airbag 18.

At least part of the airbag assembly 34 may be removably mounted to the stowage bin 14. Specifically, inflator 36 may be removably mounted to the stowage bin 14. In other words, the inflator 36 may be removed from the stowage bin 14 and replaced while maintaining the integrity of the stowage bin 14, i.e., so the storage bin is reusable. The inflator 36 may be removably mounted to the stowage bin 14 with, for example, threaded fasteners. The inflator 36 may be removable and replaceable by, for example, a service technician.

In the example where the inflator 36 is a pyrotechnic inflator, the inflator 36 and the airbag 18 may be removable from the storage bin as a unit. In other words, the inflator 36 may be disconnected from the stowage bin 14 to remove both the inflator 36 and the airbag 18 from the stowage bin 14 for replacement. As another example, the inflator 36 may be removable from the rest of the airbag assembly 34 for replacement or recharge. In examples in which the inflator 36 includes a canister of pressurized fluid, the canister may be disconnected from the rest of the airbag assembly 34 for replacement or discharge, i.e., a new or recharged canister may be re-connected to the rest of the airbag assembly 34. In such examples, the canister is removably connected to the rest of the airbag assembly 34, e.g., by threaded connection.

The airbag assembly 34 may include an inflator cover 42 removably connected to the stowage bin 14 for service or replacement of the inflator 36. The inflator cover 42 may have a class-A surface, i.e., a surface specifically manufactured to have a high-quality, finished aesthetic appearance free of blemishes.

In examples where the inflator 36 is removable from the rest of the airbag assembly 34, the airbag 18 may be reusable. In such examples, the airbag 18 may be re-folded, rolled, etc., for reuse. For example, the airbag assembly 34 may include a cover 60 that removably attaches to the stowage bin 14 to conceal the airbag 18. In the event of an sudden deceleration, the cover 60 detaches from the stowage bin 14, i.e., under forces from the inflation of the airbag 18, to allow the airbag 18 to inflate across compartment 16. The cover 60 may be re-usable, i.e., reconnected to the stowage bin 14 after release. For example, the cover 60 and/or the stowage bin 14 may include clips or other releasable fasteners that releasably connect the cover 60 to the stowage bin 14 for reconnecting the cover 60 to the stowage bin 14. The cover 60 may have a class-A surface, i.e., a surface specifically manufactured to have a high-quality, finished aesthetic appearance free of blemishes.

The vehicle 12 may include a sensor. In the event of an sudden deceleration, the sensor may detect the sudden deceleration and transmit a signal through a communications network to the computer. The computer may transmit a signal through the communications network to the inflator 36. The sensor may be an impact sensor, accelerometer, etc.

The apparatus 10 includes an external tether 44 extending from the airbag 18 to the stowage bin 14. When the airbag 18 is in the inflated position, the external tether 44 positions the airbag 18 to enclose the compartment 16 of the storage bin, i.e., to retain items in the bin in the event of a sudden deceleration. When the airbag 18 is in the inflated position, the external tether 44 will exert a force on the airbag 18, retaining any items in the bin. As the airbag 18 deploys from the uninflated position to the inflated position, the airbag 18 may deploy upwardly from the compartment 16 with the external tethers 44 pulling the airbag 18 downwardly to retain any items in the stowage bin 14, e.g., the airbag 18 may move in an arced pattern to the inflated position to increase the likelihood of going over the items in the compartment 16 to retain the items in the compartment 16. The apparatus 10 may include any suitable number of external tethers 44. In the examples shown in FIGS. 1-5, the apparatus 10 includes a pair of external tethers 44 extending from the airbag 18 to the stowage bin 14. Each of the external tethers 44 are attached to opposing sides of the airbag 18 and attach to different walls 30 of the stowage bin 14 from each other and from the airbag 18.

Figure 2:
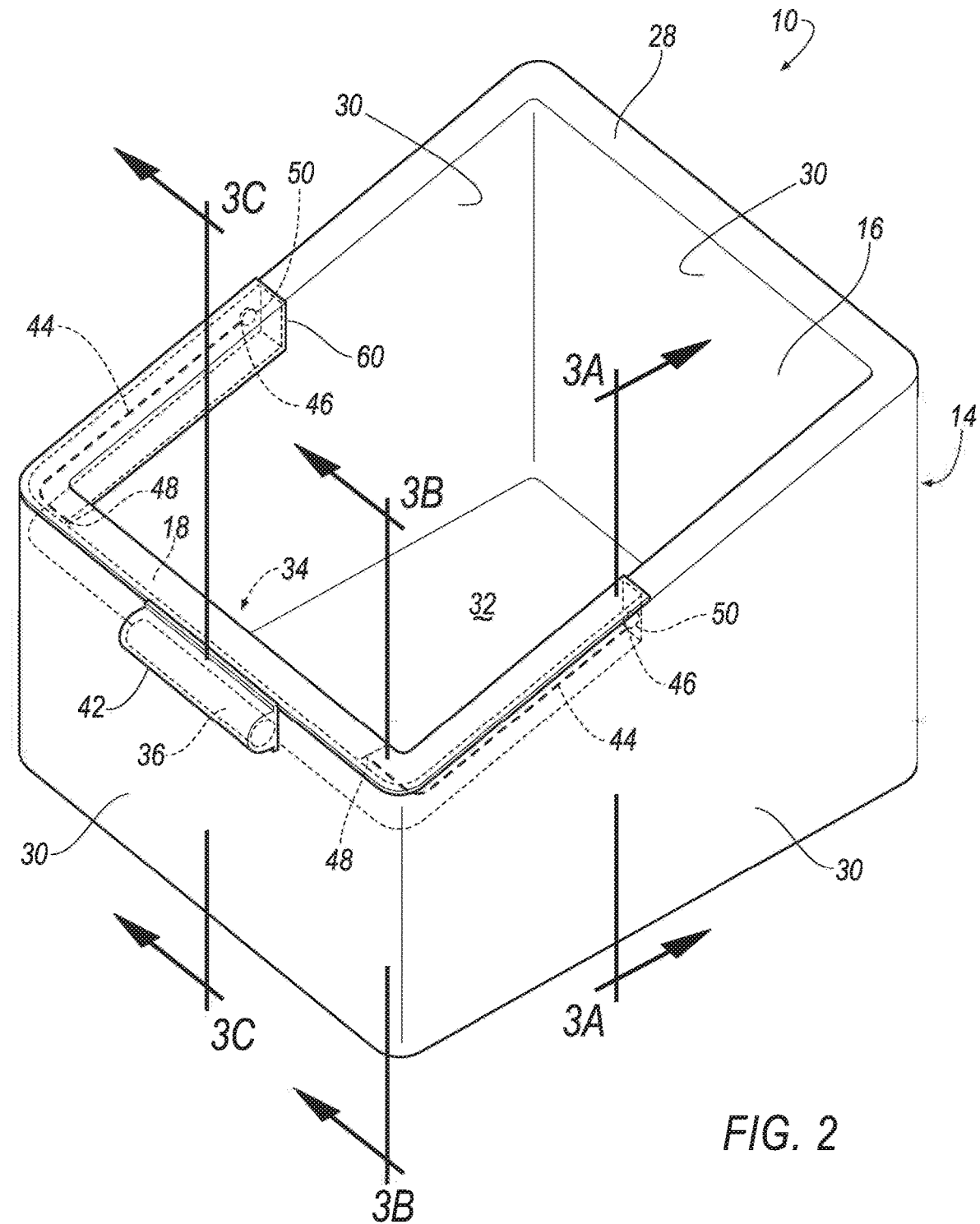
FIG. 2 is a perspective view of a single stowage bin with the airbag in an uninflated position.
Figure 3C:
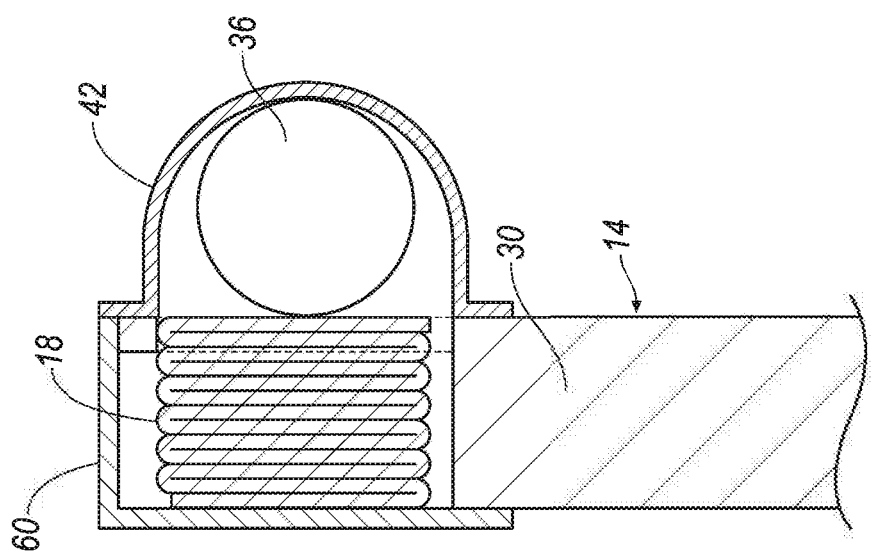
FIG. 3C is a section view through line 3C in FIG. 2.
Figure 3B:
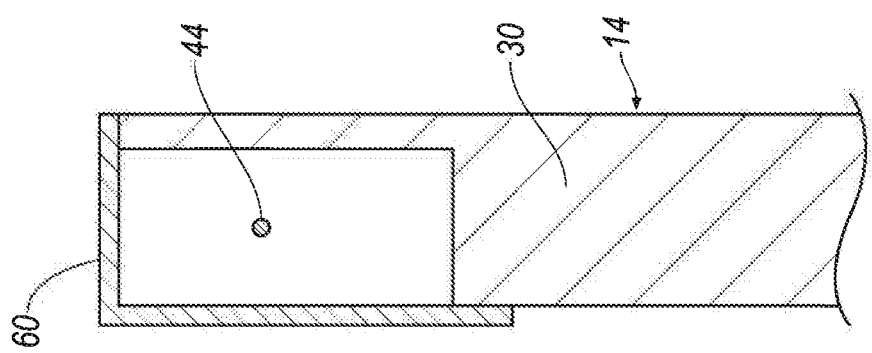
FIG. 3B is a section view through line 3B in FIG. 2.
Figure 3A:
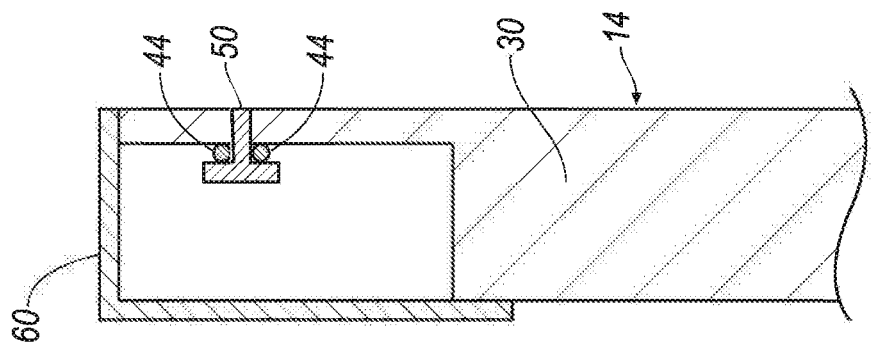
FIG. 3A is a section view through line 3A in FIG. 2.

As one example, with reference to FIGS. 1-4, each external tether 44 may have an end 46 fixed to the stowage bin 14 and an end 48 fixed to the airbag 18. The end 46 fixed to the stowage bin 14 may be fixed in any suitable fashion, e.g., a fastener 50 as shown in FIGS. 2, 3A, and 4.

As another example, with reference to FIG. 5, the external tether 44 is slidably attached to the stowage bin 14. For example, the stowage bin 14 may include a recessed track 52 and the external tether 44 may slidably engage the recessed track 52. The external tether 44 may include a loop 54 and the recessed track 52 may include a rod 56 received by the loop 54 such that the loop 54 slides along the rod 56 when the airbag 18 is inflated to the inflated position. The loop 54 may be fabric, i.e., woven. As another example, the loop 54 may be a semi-rigid material, e.g., a solid polymer. The loop 54 may be an elongated tube, a ring, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An apparatus comprising:
a stowage bin defining a compartment;
an airbag mounted to the stowage bin and deployable to an inflated position, the airbag in the inflated position at least partially enclosing the compartment;
the airbag including an inflation chamber and an uninflatable panel; and
the airbag being mounted to a wall of the stowage bin and the uninflatable panel being between the inflation chamber and the wall.

2. The apparatus of claim 1, further comprising an external tether extending from the airbag to the stowage bin.

3. The apparatus of claim 2, wherein the external tether has an end fixed to the stowage bin.

4. The apparatus of claim 2, wherein the external tether is slidably attached to the stowage bin.

5. The apparatus of claim 2, wherein the stowage bin includes a recessed track slideably engaged with the external tether.

6. The apparatus of claim 2, wherein the compartment is open upwardly.

7. The apparatus of claim 1, further comprising a vehicle seat, the airbag being between the vehicle seat and the compartment in an uninflated position.

8. The apparatus of claim 1, further comprising a pressure sensor fixed to the stowage bin below the compartment.

9. The apparatus of claim 8, wherein the compartment is open upwardly.

10. The apparatus of claim 1, further comprising a floor below the compartment and a pressure sensor supported by the floor.

11. The apparatus of claim 10, wherein the compartment is open upwardly.

12. The apparatus of claim 1, further comprising an inflator removably mounted to the stowage bin, the inflator in fluid communication with the airbag.

13. The apparatus of claim 12, wherein the inflator is a pyrotechnic inflator.

14. The apparatus of claim 12, wherein the inflator includes a canister of pressurized fluid.

15. The apparatus of claim 12, further comprising a vehicle seat, the inflator mounted to the stowage bin between the vehicle seat and the compartment.

16. The apparatus of claim 1, wherein the stowage bin includes an upper lip around the compartment, the airbag being supported by the upper lip.

17. The apparatus of claim 1, wherein the compartment is open upwardly.

18. An apparatus comprising:
a stowage bin defining a compartment;
an airbag mounted to the stowage bin and deployable to an inflated position, the airbag in the inflated position at least partially enclosing the compartment; and
an external tether extending from the airbag to the stowage bin;
the stowage bin including a recessed track slideably engaged with the external tether.

19. The apparatus of claim 18, wherein the airbag includes an inflation chamber and an uninflatable panel.

20. The apparatus of claim 19, wherein the airbag is mounted to a wall of the stowage bin and the uninflatable panel is between the inflation chamber and the wall.

* * * * *